(12) United States Patent
Delaney et al.

(10) Patent No.: US 9,340,006 B2
(45) Date of Patent: May 17, 2016

(54) SYSTEM AND METHOD FOR REMOTELY MONITORING THE STATUS OF A SECURITY PRINTER, MONITORING AND CONTROLLING THE NUMBER OF SECURE MEDIA TRANSACTIONS BY A SECURITY PRINTER, AND AUTHENTICATING A SECURE MEDIA TRANSACTION BY A SECURITY PRINTER

(71) Applicant: CTPG Operating, LLC, Ithaca, NY (US)

(72) Inventors: Robert Delaney, Ithaca, NY (US); Kyle Turner, Binghamton, NY (US)

(73) Assignee: CTPG Operating, LLC, Ithaca, NY (US)

( * ) Notice: Subject to any disclaimer, the term of this patent is extended or adjusted under 35 U.S.C. 154(b) by 0 days.

(21) Appl. No.: 14/636,450

(22) Filed: Mar. 3, 2015

(65) Prior Publication Data

US 2015/0248600 A1  Sep. 3, 2015

Related U.S. Application Data

(60) Provisional application No. 61/947,111, filed on Mar. 3, 2014, provisional application No. 61/947,121, filed on Mar. 3, 2014, provisional application No. 61/947,135, filed on Mar. 3, 2014, provisional (Continued)

(51) Int. Cl.
*G06F 15/00* (2006.01)
*B41F 19/02* (2006.01)
(Continued)

(52) U.S. Cl.
CPC .............. *B41F 19/02* (2013.01); *B41J 2/325* (2013.01); *B41J 3/38* (2013.01); *G06F 3/1222* (2013.01);

(Continued)

(58) Field of Classification Search
CPC .... G06F 3/1236; G06F 3/1238; G06F 3/1259
USPC ........................................................ 358/1.14
See application file for complete search history.

(56) References Cited

U.S. PATENT DOCUMENTS

| 4,638,340 A | 1/1987 | Iiyama |
| 4,827,425 A | 5/1989 | Linden |

(Continued)

FOREIGN PATENT DOCUMENTS

| CN | 101105837 | 1/2008 |
| CN | 102509032 | 6/2012 |

(Continued)

OTHER PUBLICATIONS

Wilson, S., The "Security Printer" Model for CA Operations, Lockstep White Paper No. 3, Sep. 2005, pp. 1-7, Lockstep Consulting Pty Ltd.

(Continued)

*Primary Examiner* — Saeid Ebrahimi Dehkordy
(74) *Attorney, Agent, or Firm* — Bond Schoeneck & King, PLLC; George McGuire; Frederick Price

(57) ABSTRACT

A system and method for securing a printer. The system including a server, comprising a nontransitory storage medium, storing program code configured to: receive a disconnect notice having a disconnect timestamp, the disconnect timestamp representing a time a printer was disconnected from a host computer; receive from a reader a request for validation, the request having a print timestamp derived from a security feature printed by the printer; compare the disconnect timestamp with the print timestamp to determine if the security feature was printed after printer was disconnected from the host computer.

17 Claims, 4 Drawing Sheets

Related U.S. Application Data application No. 61/947,143, filed on Mar. 3, 2014, provisional application No. 61/947,152, filed on Mar. 3, 2014, provisional application No. 61/947,160, filed on Mar. 3, 2014, provisional application No. 61/947,174, filed on Mar. 3, 2014, provisional application No. 61/947,197, filed on Mar. 3, 2014, provisional application No. 61/947,206, filed on Mar. 3, 2014, provisional application No. 61/947,214, filed on Mar. 3, 2014.

(51) Int. Cl.
| | |
|---|---|
| *G06F 3/12* | (2006.01) |
| *G06F 21/44* | (2013.01) |
| *G06F 21/60* | (2013.01) |
| *G06K 15/00* | (2006.01) |
| *H04N 1/00* | (2006.01) |
| *G06K 15/02* | (2006.01) |
| *H04N 1/32* | (2006.01) |
| *B41J 2/325* | (2006.01) |
| *B41J 3/38* | (2006.01) |

(52) U.S. Cl.
CPC ............ *G06F 3/1236* (2013.01); *G06F 3/1238* (2013.01); *G06F 3/1259* (2013.01); *G06F 3/1273* (2013.01); *G06F 3/1285* (2013.01); *G06F 3/1288* (2013.01); *G06F 3/1293* (2013.01); *G06F 3/1294* (2013.01); *G06F 21/44* (2013.01); *G06F 21/602* (2013.01); *G06F 21/608* (2013.01); *G06K 15/028* (2013.01); *G06K 15/4095* (2013.01); *H04N 1/00204* (2013.01); *H04N 1/3232* (2013.01); *H04N 2201/0082* (2013.01); *H04N 2201/3269* (2013.01)

(56) References Cited

U.S. PATENT DOCUMENTS

| | | | |
|---|---|---|---|
| 5,512,977 | A | 4/1996 | Imai |
| 5,552,009 | A | 9/1996 | Zager |
| 5,619,026 | A | 4/1997 | Chou |
| 5,991,411 | A | 11/1999 | Kaufman |
| 6,196,459 | B1 | 3/2001 | Goman |
| 6,202,155 | B1 | 3/2001 | Tushie |
| 6,203,069 | B1 | 3/2001 | Outwater |
| 6,335,799 | B1 | 1/2002 | Provost |
| 6,362,869 | B1 | 3/2002 | Silverbrook |
| 6,362,893 | B1 | 3/2002 | Francis |
| 6,367,011 | B1 | 4/2002 | Lee |
| 6,390,377 | B1 | 5/2002 | Dlugos |
| 6,394,358 | B1 | 5/2002 | Thaxton |
| 6,396,594 | B1 | 5/2002 | French |
| 6,597,385 | B2 | 7/2003 | Verdyck |
| 6,650,430 | B2 | 11/2003 | Francis |
| 6,738,903 | B1 | 5/2004 | Haines |
| 6,750,985 | B2 | 6/2004 | Rhoads |
| 6,985,600 | B2 | 1/2006 | Rhoads |
| 6,991,164 | B2 | 1/2006 | Lemelson |
| 7,020,781 | B1 * | 3/2006 | Saw ............... G06F 21/608 705/51 |
| 7,025,269 | B2 | 4/2006 | Marshall |
| 7,099,026 | B1 | 8/2006 | Hren |
| 7,229,025 | B2 | 6/2007 | Sussmeier |
| 7,233,930 | B1 | 6/2007 | Ryan, Jr. |
| 7,284,279 | B2 | 10/2007 | Morrison |
| 7,286,150 | B2 | 10/2007 | Hann |
| 7,383,768 | B2 | 6/2008 | Reichwein |
| 7,460,252 | B2 | 12/2008 | Campbell |
| 7,535,586 | B2 | 5/2009 | Kumashio |
| 7,546,952 | B2 | 6/2009 | Knowles |
| 7,556,444 | B2 | 7/2009 | Kurashina |
| 7,588,188 | B2 | 9/2009 | Knowles |
| 7,614,560 | B2 | 11/2009 | Knowles |
| 7,691,280 | B2 | 4/2010 | Waldrop |
| 7,852,359 | B2 | 12/2010 | Evans |
| 7,958,359 | B2 | 6/2011 | Sharma |
| 8,033,477 | B2 | 10/2011 | Jones |
| 8,045,191 | B2 | 10/2011 | Yamanaka |
| 8,085,438 | B2 | 12/2011 | Hersch |
| 8,100,330 | B2 | 1/2012 | Bulan |
| 8,203,583 | B2 | 6/2012 | Wilsher |
| 8,240,797 | B2 | 8/2012 | Haas |
| 8,339,632 | B2 | 12/2012 | Wasamoto |
| 8,345,316 | B2 | 1/2013 | Bradley |
| 8,355,180 | B2 | 1/2013 | Wu |
| 8,395,646 | B2 | 3/2013 | Yamamoto |
| 8,402,371 | B2 | 3/2013 | Tang |
| 8,424,751 | B2 | 4/2013 | Liu |
| 8,481,108 | B2 | 7/2013 | Roth |
| 8,496,186 | B2 | 7/2013 | Ito |
| 8,551,387 | B2 | 10/2013 | Feldman |
| 8,593,696 | B2 | 11/2013 | Picard |
| 8,687,241 | B2 | 4/2014 | Simske |
| 8,736,897 | B2 | 5/2014 | Pierce |
| 8,826,004 | B2 | 9/2014 | Euchner |
| 2002/0042884 | A1 | 4/2002 | Wu |
| 2002/0051167 | A1 | 5/2002 | Francis |
| 2003/0145218 | A1 | 7/2003 | Hutchison |
| 2004/0050936 | A1 | 3/2004 | Look |
| 2004/0179078 | A1 | 9/2004 | Gundjian |
| 2006/0044589 | A1 | 3/2006 | Nakagawaji |
| 2006/0088160 | A1 | 4/2006 | Brown |
| 2006/0212715 | A1 | 9/2006 | Terao |
| 2007/0091377 | A1 | 4/2007 | Smith |
| 2007/0103536 | A1 | 5/2007 | Fujimaki |
| 2009/0086967 | A1 | 4/2009 | Ozawa |
| 2010/0012736 | A1 | 1/2010 | Wilds |
| 2010/0071077 | A1 | 3/2010 | Morris |
| 2010/0108874 | A1 | 5/2010 | Zahedi |
| 2011/0016388 | A1 | 1/2011 | Tang |
| 2011/0045256 | A1 | 2/2011 | Luther |
| 2011/0123132 | A1 | 5/2011 | Schneck |
| 2012/0176651 | A1 | 7/2012 | Pham |
| 2013/0015236 | A1 | 1/2013 | Porter |
| 2013/0141755 | A1 | 6/2013 | Miller |
| 2013/0215474 | A1 | 8/2013 | Caton |
| 2013/0320099 | A1 | 12/2013 | Acton |
| 2014/0185800 | A1 | 7/2014 | Fallon |
| 2014/0233053 | A1 | 8/2014 | Kakutani |

FOREIGN PATENT DOCUMENTS

| | | |
|---|---|---|
| CN | 102658739 | 9/2012 |
| EP | 1335265 | 8/2003 |
| JP | 2003334997 | 11/2003 |
| JP | 2005202553 | 7/2005 |
| JP | 2007058535 | 3/2007 |
| KR | 20040099065 | 11/2004 |
| KR | 20040100540 | 12/2004 |
| WO | 2005051676 | 6/2005 |
| WO | 2009106107 | 9/2009 |

OTHER PUBLICATIONS

Security Printing and Seals, Chapter 14, pp. 433-455.

Simske, S., Aronoff, J., Sturgill, M., Security Printing Deterrents: A Comparison of Thermal Ink Jet, Dry Electrophotographic, and Liquid Electrophotographic Printing, Journal of Imaging Science and Technology, 2008, vol. 52(5).

Jordan, F., Yribar, J., Turning Your Smartphone Into an Authentication Device, International Pharmaceutical Industry, 2013, pp. 104-112, vol. 5, Issue 3.

Lexmark Cutting-Edge Security for Printers and MFPs brochure, Lexmark, 2011.

Hattersley, J., Invisible and Fluorescing Bar Code Printing and Reading, InData Systems, Industrial Data Entry Automation Systems Incorporated, pp. 1-12.

(56) References Cited

OTHER PUBLICATIONS

Digital Printing Security Solutions, Best Practices, Kodak, 2011.
Extend Labeling Control Beyond the Enterprise, http://www.nicelabel.com/products/powerforms-web, Jun. 25, 2014.
Security Features of Lexmark Laser Printers: Overview, Technical White Paper, Lexmark, copyright 2005.
International Search Report, International Application No. PCT/US2015/018398, pp. 1-14, Dated Aug. 10, 2015.

* cited by examiner

SYSTEM AND METHOD FOR REMOTELY MONITORING THE STATUS OF A SECURITY PRINTER, MONITORING AND CONTROLLING THE NUMBER OF SECURE MEDIA TRANSACTIONS BY A SECURITY PRINTER, AND AUTHENTICATING A SECURE MEDIA TRANSACTION BY A SECURITY PRINTER

RELATED APPLICATION DATA

The present application claims priority to and the benefit of U.S. provisional patent application No. 61/947,111, filed on Mar. 3, 2014; U.S. provisional patent application No. 61/947,121, filed on Mar. 3, 2014; U.S. provisional patent application No. 61/947,135, filed on Mar. 3, 2014; U.S. provisional patent application No. 61/947,143, filed on Mar. 3, 2014; U.S. provisional patent application No. 61/947,152, filed on Mar. 3, 2014; U.S. provisional patent application No. 61/947,160, filed on Mar. 3, 2014; U.S. provisional patent application No. 61/947,174, filed on Mar. 3, 2014; U.S. provisional patent application No. 61/947,197, filed on Mar. 3, 2014; U.S. provisional patent application No. 61/947,206, filed on Mar. 3, 2014; and U.S. provisional patent application No. 61/947,214, filed on Mar. 3, 2014, the entire contents of which are hereby incorporated by reference.

FIELD OF THE INVENTION

The present invention relates to printers capable of printing security features on a media substrate and, more particularly, to a system and method for detecting when a security printer has printed more documents than requested by a host computer, monitoring and detecting when a security printer has been disconnected from an authorized host printer and when a secured document has been printed after the security printer has been disconnected from an authorized host computer, and comparing a scanned security feature against a log of when a security printer was connected to an authorized host computer.

BACKGROUND

Security printing relates to the practice of manufacturing a media substrate with certain security indicia/features to prevent forgery and counterfeiting of items such as passports, checks, bank notes, and prescription pads. As should be understood by those of ordinary skill in the art, security printing can include, for example, the inclusion of non-embossment security features such as watermarks, UV coatings, security fibers, microprinting, holograms, phosphorescent inks, and pantographs (e.g., "void") etc. in the manufacture of the media substrate. Security documents (documents with security features/patterns) are used across a diverse marketplace to deter fraud, counterfeiting and theft. In most cases, the security features are pre-printed on media. The pre-printed media must be stored in a secure location so that counterfeiters and thieves are not able to obtain the secure media which would allow them to freely print fraudulent documents.

There are some printers that can print these secure patterns on demand on standard media. The advantage of these "security printers" is that standard media does not have to be secured from theft as the secure documents can be created on demand.

However, security printers are potential targets for counterfeiters. Counterfeiters desiring to commandeer a security printer may resort to hacking into a printer, or stealing the printer outright. A hacked or stolen printer would represent a potential large-scale security breach because the potency of a single printer to generate so many counterfeit documents. Accordingly, there exists a need in the art to detect when a printer is hacked or stolen, and to lock the printer or alternatively to notify the user that a printer has potentially been stolen.

SUMMARY OF THE INVENTION

The present invention recognizes that security printers are targets for counterfeiters and should be locked upon being hacked or stolen. Accordingly, various embodiments are directed to a system and method for detecting when a security printer has printed more documents than requested by a host computer, and a system and method for monitoring and detecting when a security printer has been disconnected from an authorized host printer and when a secured document has been printed after the security printer has been disconnected from an authorized host computer. Wherein a first embodiment compares the number of security features printed by a printer with the number of requests for a security feature to be printed by an authorized host computer, to determine if a security feature was printed by a computer other than an authorized computer. Another embodiment is directed to a system and method for comparing a scanned security feature against a log of when a security printer was connected to an authorized host computer.

According to an aspect, a server, comprising a nontransitory storage medium, storing program code configured to: receive a disconnect notice having a disconnect timestamp, the disconnect timestamp representing a time a printer was disconnected from a host computer; receive from a reader a request for validation, the request having a print timestamp derived from a security feature printed by the printer; compare the disconnect timestamp with the print timestamp to determine if the security feature was printed after printer was disconnected from the host computer.

According to an embodiment, the disconnect notice is received from the host computer.

According to an embodiment, the disconnect notice is received from the printer.

According to an embodiment, the server is further configured to: notify a user upon determining that the security feature was printed after the disconnect timestamp.

According to an embodiment, the server is further configured to: lock the printer upon determining at least one of the following: that the printer was disconnected from the host computer; and that the security feature was printed after the disconnect timestamp.

According to an embodiment, the server is further configured to: receive a reconnect notice having a reconnect timestamp, the reconnect timestamp representing a time the printer was reconnected to the host computer; compare the disconnect timestamp with the reconnect timestamp to determine if the security feature was printed before the printer was reconnected to the host computer.

According to an embodiment, the reconnect notice is received from the host computer.

According to an embodiment, the reconnect notice is received from the printer.

According to an embodiment, the server is further configured to: notify a user upon determining that the security feature was printed after the disconnect timestamp and before the reconnect timestamp.

According to an embodiment, the server is further configured to: lock the printer upon determining that the security feature was printed after the disconnect timestamp and before the reconnect timestamp.

According to an another aspect, a server, comprising a nontransitory storage medium, storing program code configured to: receive a print value representing a number of instances that a printer has printed a security feature; receive a request value representing a number of instances that a host computer has requested that the printer print the security feature; and compare the print value to the request value to determine whether a security feature was printed without a request by the host computer.

According to an embodiment, the server is further configured to lock the printer upon determining that the print value exceeds the request value.

According to an embodiment, the server is further configured to notify a user upon determining that the print value exceeds the request value.

According to an embodiment, the print value is received from the printer.

According to an embodiment, the print value is received from the host computer.

According to another aspect, a computer comprising a nontransitory storage medium, storing program code configured to: receive a print value representing a number of instances that a printer has printed a security feature; retrieve a stored predetermined authorized print value representing a predetermined limit on a number of instances that the printer is authorized to print the security feature; compare the print value to the predetermined authorized print value to determine whether a security feature was printed outside of the predetermined limit.

According to an embodiment, the computer is further configured to lock the printer upon determining that the print value exceeds the predetermined limit.

According to an embodiment, the computer is, further configured to notify a user upon determining that the print value exceeds the predetermined limit.

According to an embodiment, the print value is received from the printer.

According to an embodiment, the print value is received from the host computer.

In accordance with a preferred embodiment of the present invention, a specialized improved computer system is created—here the devices and/or systems that are specifically structured, configured, connected, and/or programmed to determine if a secured printer has been stolen or hacked. In one embodiment, the devices and/or system determine if a security feature has been printed by a secured printer a greater number of times than an authorized host has requested the security feature be printed. If the security printer has printed more documents than requested, it may be inferred that the printer was hacked or stolen (and disconnected from an authorized printer—a computer (including a server computer) with permission to send print and other commands to the security printer), and an investigation can begin to confirm the same. An embodiment of the system can monitor and detect when a security printer has been disconnected from an authorized printer, and the printer can be shut down by an authorized host computer if and when the printer is connected to a network and/or is otherwise connectable by the authorized printer. In another embodiment, the devices and/or system compare a printed timestamp to a log of when the printer was connected to an authorized computer. If the timestamp was printed when the printer after disconnection from an authorized computer and when the printer was not connected to an authorized computer, it may be inferred that the printer was hacked or stolen.

The data transmission, communication, and any control signals between the at least one host computer and the printer are sent and received pursuant to wired or wireless communication. The wireless communication/transmission can be over a network, which can be any suitable wired or wireless network capable of transmitting communication, including but not limited to a telephone network, Internet, Intranet, local area network, Ethernet, online communication, offline communications, wireless communications and/or similar communications means. The wireless transmission can be accomplished through any wireless protocol/technology, including, but not limited to, ZigBee standards-based protocol, Bluetooth technology, and/or Wi-Fi technology. Further, this data can be encrypted as needed based on the sensitivity of the data or the location the printer, for example. The devices can be located in the same room, in a different room in the same building, and/or in a completely different building and location from each other. A user using a host computer (or a different computer) can send data transmission, control or communication signals to the printer perform any of the functionalities described herein.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
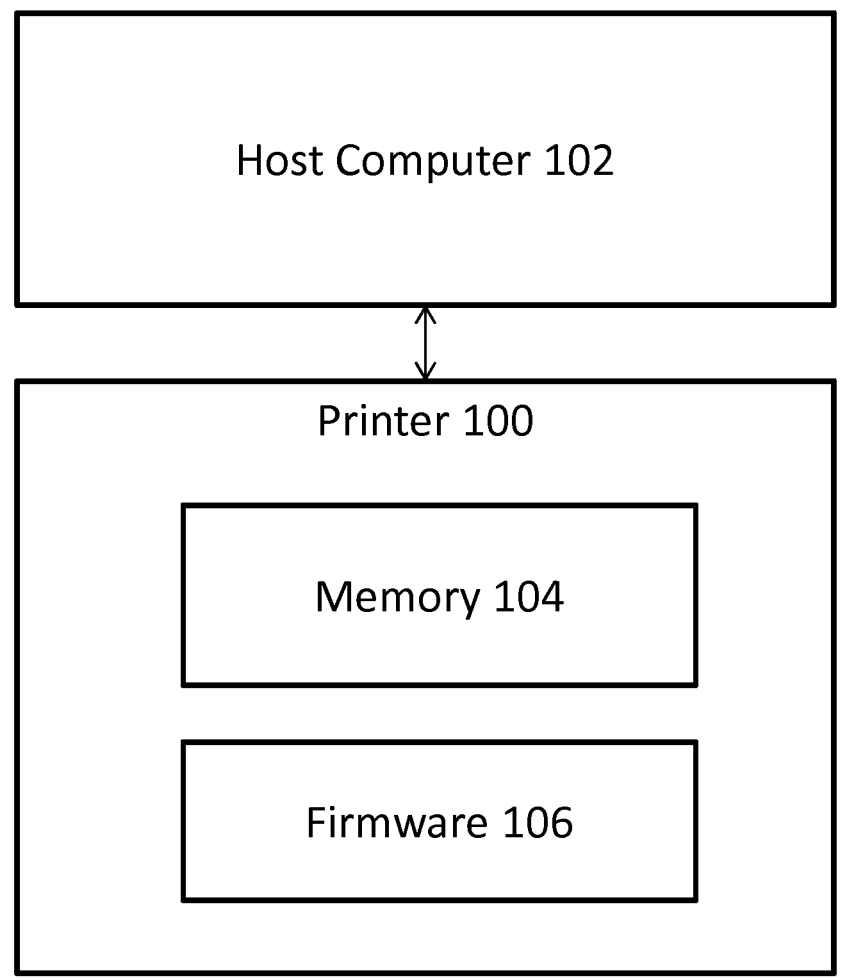
FIG. 1 is a system architecture diagram of a printer that is in communication with a host computer, according to an embodiment of the present invention.

The present invention will be more fully understood and appreciated by reading the following Detailed Description in conjunction with the accompanying drawings, wherein like reference numerals refer to like components.

Embodiments of a thermal printer, examples of which can be used as the printer in conjunction with embodiments of the methods and systems described herein and shown in the referenced Figures, exist and are possible. Applicant hereby incorporates by reference the embodiments of thermal printer 104 disclosed in paragraphs [0010]-[0014] and [0028]-[0031] and FIGS. 1-4 of U.S. Pat. Application Publication Number 2015/0009271, entitled "System and Method of Thermal Printing Security Features." The thermal printer can be connected, configured, programmed and/or structured to perform the functions described herein.

Embodiments of a thermal transfer printer, examples of which can be used as the printer in conjunction with embodiments of the methods and systems described herein and shown in the referenced Figures, exist and are possible. The thermal transfer printer can be connected, configured, programmed and/or structured to perform the functions described herein.

Even though thermal printers and thermal transfer printers are specifically referenced and described in certain embodiments herein, other digital printers and corresponding appropriate media substrates (e.g., thermal and standard media) are contemplated to be part of the systems and methods described herein.

Turning to FIG. 1, a system architecture diagram of a thermal printer 100 that is structured, configured, and/or programmed to print security features such as pantographs, watermarks, secured barcodes, and microprinting on a thermal media substrate (not shown), and can have various communication links to a computer 102, according to an embodiment of the present invention is shown. A user using the computer 102 (or a different computer 102) can instruct the thermal printer 100 to print a particular pre-stored security feature (e.g., a particular pantograph loaded in memory of the thermal printer 100) on a thermal media substrate, and to merge the particular security feature with variable data.

The thermal printer 100 can include a memory 104 that can store at least one security feature and preferably, a plurality of security features, and firmware 106 that can be programmed to print the at least one security feature, and preferably, the plurality of security features on demand that are stored in the memory, and to merge the security feature(s) with variable data (such as receipt, check, or prescription data, for example, as should be understood by those of skill in the art) preferably in real time depending on the particular application. The firmware 106 and memory 104 can have wired/wireless communication connections to the computer 102. In an alternative embodiment, the security feature (such as a pantograph) can be stored, updated, etc. on the computer 102.

Figure 2:
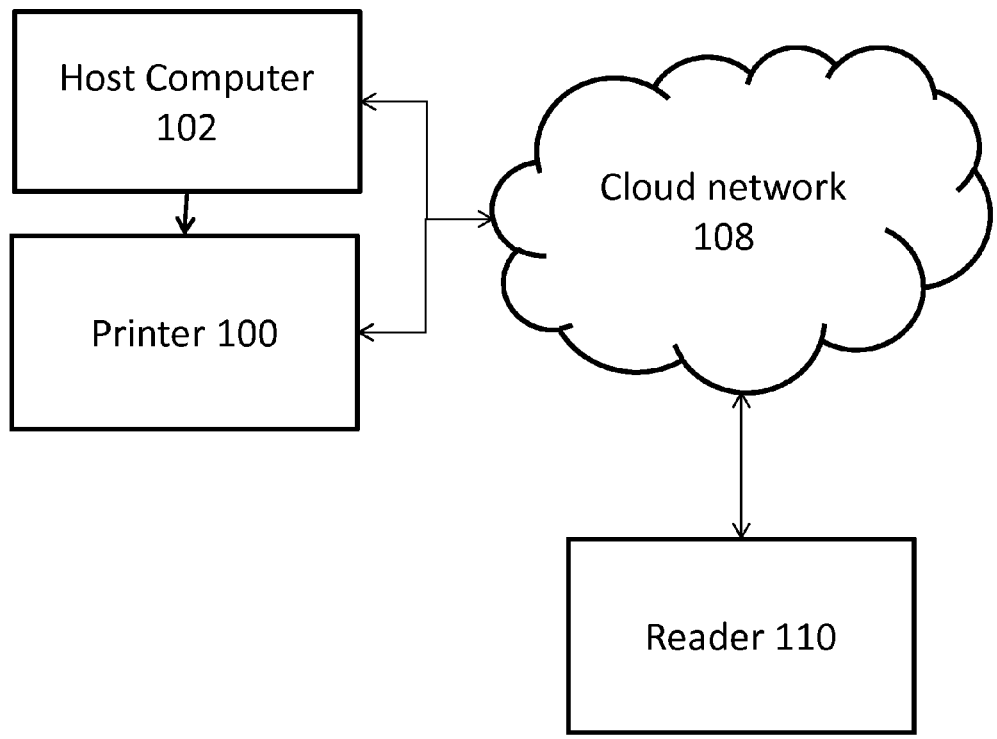
FIG. 2 is a system architecture diagram of a printer in communication with a host computer, a cloud network, and a reader.

Turning to FIG. 2, a system architecture is shown of the thermal printer 100 and host computer 102 connected to a cloud network 108. The cloud network may comprise a plurality of interconnected servers. The plurality of interconnected servers may form a local network or a remote network. Cloud network 108 may host a web application or web site. As shown, both printer 100 and host computer 102 may be connected to cloud network 108. Alternatively, only printer 100 may be connected to cloud network. In yet another embodiment, only host computer 192 may be connected to cloud network 108.

FIG. 2 also shows a reader 110 connected to cloud network 108. Reader 110 may be configured to read at least one kind of security feature as may be printed by printer 100. For example, reader 110 may be configured to read a secured barcode, as printed by printer 100; the secured barcode having an extra security layer that may not be read by normal barcode readers. Reader 110, upon reading a barcode, may query cloud network 108 to determine whether the read security feature is valid. For example, upon reading a secured barcode, reader 110 may notify cloud network 108 of the read data and request confirmation that the data was printed by an authorized user. Other embodiments and uses of the above described system architecture will be apparent when reviewed with the embodiments disclosed in the remainder of this disclosure.

Figure 3:
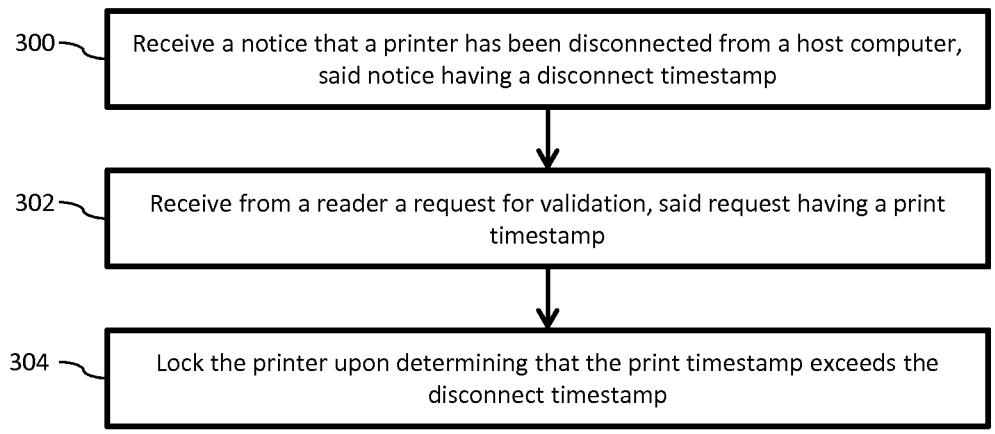
FIG. 3 is a flowchart of a method according to an embodiment of the present invention.

Cloud network may store and implement an algorithm, the steps of which are shown in FIG. 3, according to an embodiment. In step 300, cloud network 108 may receive a notice that printer 100 has been disconnected from host computer 102, the notice containing a disconnect timestamp. The disconnect timestamp representing the approximate point in time when printer 100 was disconnected from computer 102. In an exemplary embodiment, the notice is received from host computer 102 upon the disconnection of the printer. However, if host computer is not powered, or otherwise connected to cloud network 108 upon disconnect, the notice may be sent to cloud network once host computer 102 is powered on or reconnected to cloud network 108. In an alternate embodiment, the notice may be received from printer 100. Similarly, if printer 100 is not powered or is not connected to the network, it may be transmitted upon reconnecting. As part of step 300, cloud network 108 may store received disconnect timestamp for later retrieval Disconnect notice may contain information in addition to the disconnect timestamp, such as the serial number printer 100 disconnected, the serial number of the host computer 102 printer 100 was disconnected from, that host computer is an authorized computer, etc.

Additionally, a notice may be issued to a user upon disconnecting printer 100, such that the user may investigate whether printer 100 had been stolen. Notifying a user may occur via a form of electronic communication, such as through e-mail, text message, social networking message, etc. The notification may be sent from cloud network 108 or directly from computer 102.

In step 302, cloud network 108 may receive from reader 110 a request for validation, the request having a print timestamp. In an exemplary embodiment, at least one form of security feature, such as a secured barcode, may contain a timestamp when printed, representing the time the document was printed by security printer (or, alternatively, when it was requested to be printed by host computer 102). Thus, in step 302 reader 110, reading the security feature, may transmit this print timestamp to cloud network 108. As part of step 302, cloud network 108 may store received print timestamp for later retrieval.

In step 304, the print timestamp and the disconnect timestamp may be compared. If the print timestamp is later than the disconnect timestamp, the cloud network 108 may return a notice to reader 110 including this information. Additionally, if the print timestamp is later than the disconnect timestamp, cloud network may lock printer 100 if and when it is able to connect to the printer 100. In an exemplary embodiment, cloud network 108 locks printer 100 by issuing a command directly to printer 100 to lock. However, in alternative embodiments, locking printer 100 may be performed by issuing a command to host computer 102, which may then lock printer 100. As part of step 304, cloud network 108 may retrieve the stored value(s) of earlier received disconnect timestamps, and compare those retrieved disconnect timestamps with the print timestamp receive in step 302. In another embodiment, a notice may be sent from cloud network 108, or other source, notifying a user that a read security feature was printed when printer 100 was disconnected. Notifying a user may occur via a form of electronic communication, such as through e-mail, text message, social networking message, etc. In alternate embodiments, this step may occur in addition to or instead of locking printer 100.

In an alternative embodiment, cloud network 108 may also receive a reconnect notice, the notice having a reconnect timestamp, when printer 100 is reconnected to the authorized host computer 102 after having been disconnected. In this embodiment, cloud network compares the received print timestamp with the received disconnect and reconnect timestamps to determine whether the printed security feature was printed in an interval when printer 100 was not connected to the authorized host computer 102. In other words, if print timestamp falls between an adjacent disconnect timestamp and reconnect timestamp, cloud network may determine that printer 100 was disconnected from host computer 102 at the time the security feature was printed—inferring that the security feature was printed by another potentially unauthorized computer or device besides host computer 102. For example, if disconnect timestamp reads 12:00 pm and reconnect timestamp reads 1:00 pm, a print timestamp at 12:08 pm, would be invalid, unless the print job was done when connected to another authorized computer (The host computer 102 and/or cloud network can each store a list of all authorized computers and the printers with which each authorized computer is authorized to send print and other commands (e.g., change security features, update security features, change or update passwords etc.)). This is true so long as no other disconnect or reconnect timestamps are received between 12:00 pm and 1:00 pm, or, in other words, the disconnect and reconnect timestamps are adjacent. If the print timestamp falls between adjacent disconnect and reconnect notices, cloud network 108 may return a notice that the secured barcode is invalid, may lock the printer, and issue a notice to the user, or any combination of the mentioned actions.

Reconnect notice may be received from host computer 102, or from printer 100 itself. It should be noted that reconnect notice and disconnect notice may be issued from separate authorized computers (as mentioned above). For example, if printer 100 is connected to a first authorized host computer, disconnected and reconnected to a second authorized host computer 102, second authorized host computer may issue the reconnect notice. In this instance, since the disconnect and reconnect notices are issued regarding the same printer 100, but different authorized computers, there may be no need to issue a lock command to the printer and the print jobs performed when connected to each authorized computer may be authorized and validated (unless the print jobs were performed outside of a predetermined print job limit) Furthermore, if printer 100 issues the reconnect notice, printer can be programmed to first determine whether the reconnected computer is an authorized computer, to avoid sending a reconnect notice of an unauthorized computer to cloud network 108, thus appearing to print from an authorized computer. If a reconnect notice is received from the printer while connected to an unauthorized computer, the cloud network 108 can be programmed to determine whether the connected computer is unauthorized by performing a look-up and compare function with a stored list of authorized computers, and issue a lock command to the printer if actually connected to an unauthorized computer.

It should also be noted that if a printer has been reconnected it may not be advantageous to lock a printer that is already reconnected to an authorized computer. As such, according to one embodiment, at step 304, the locking of the printer may not be performed where the printer has been reconnected to an authorized computer.

Reconnect notice may contain information in addition to the reconnect timestamp, such as the serial number printer 100 reconnected, the serial number of the host computer 102 printer 100 was reconnected to, whether host computer 102 is an authorized computer etc.

Figure 4:
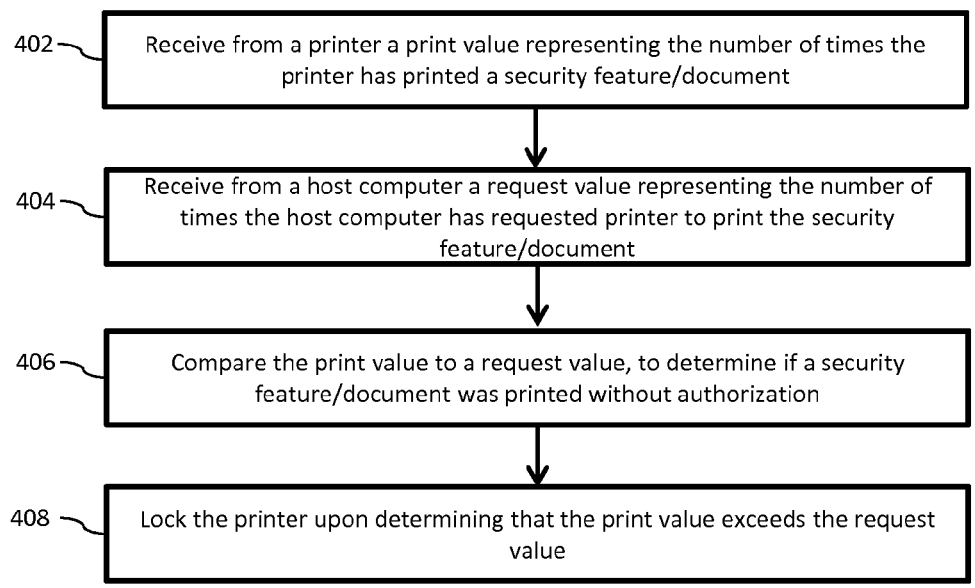
FIG. 4 is a flowchart of a method according to an embodiment of the present invention.

The steps of a second algorithm are shown in FIG. 4 can be stored and implemented on cloud network 108, according to an embodiment. In step 402, cloud network 108 may receive from a printer at least one print value representing the number of times the printer has printed a particular security feature or security document. The particular security feature may be a secured barcode, pantograph, watermark, or other feature as will be appreciated by a person of ordinary skill in the art in conjunction with a review of this disclosure.

As part of this step, printer 100 may be programmed to store the number of times each security feature, or alternatively, a particular security document, is printed. Additionally, printer 100 may store the security features/documents printed over a particular period of time. For example, printer 100 may store the number of times a particular security feature/document is printed over the course of a day. Alternatively, printer 100 may store the number of times a particular security feature/document has printed since the last time a print value was transmitted (as will be discussed in later steps).

The stored value may be periodically queried, or alternately pushed, to cloud network 108. In alternate embodiments, the value may be received directly from printer 100, or via host computer 102, or some other device. For example, in one embodiment, the value may first be transmitted to host computer 102, which may then transmit the value to cloud network 108. In this embodiment, cloud network may query host computer 102 for the print value. Further, the print value may be received at different intervals. For example, the print value could be received once a day, or once an hour, or once a minute. Alternately, the print value may queried, or pushed, upon an event such as a user's command, or every time the host computer requests the value to be printed.

In step 404, cloud network 108 receives from host computer 102, a request value representing a number of times the host computer has requested printer to print a security feature/document. In exemplary embodiment, host computer stores each request to print a security document, the same security features, or set of security features, stored by the printer, over a concurrent period of time. Accordingly, the stored request value may be queried, or pushed, to cloud network 108. In an exemplary embodiment, the stored request value may be received by cloud network 108 at the same, or substantially the same time the print value is received by cloud network 108.

In step 406, once cloud network 108 has received the print value and request value, the values are compared to determine if a security feature/document was printed without authorization. In particular, cloud network 108 determines whether print value exceeds request value, whereupon it may be inferred that a security feature/document was printed without a request from host computer 102.

As an alternative to the request value, a predetermined authorized print value representing the number of security features/documents that can be printed within a particular time frame, for example, can be stored on the host computer and transmitted to the printer or vice versa, and the predetermined allowed value can be compared to the request value.

Upon determining that the print value exceeds the request value (or the predetermined authorized print value), printer 100 may be locked in step 408. In an exemplary embodiment, cloud network 108 locks printer 100 by issuing a command directly to printer 100 to lock. However, in alternative embodiments, locking printer 100 may be performed by issuing a command to host computer 102, which may then lock printer 100. In another embodiment, a notice may be sent from cloud network 108, or other source, notifying a user that a document was printed without a request from host computer 102. Notifying a user may occur via a form of electronic communication, such as through e-mail, text message, social networking message, etc. In alternate embodiments, this step may occur in addition to or instead of locking printer 100.

Instead of implementing the above algorithm on cloud network 108, it may instead be implemented on host computer 102. For example, host computer 102 may receive from printer 100 the print value, and compare it to its own stored request value. Upon determining that the request value exceeds the print value, host computer 102 may lock printer or notify user via electronic communication of an unauthorized printed security feature, or both.

In accordance with another embodiment, the printer 100 can be programmed or configured, and contain the logic and/or an algorithm, to lock itself as required or described with reference to any of the embodiments set forth above.

A "module," as may be used herein, can include, among other things, the identification of specific functionality represented by specific computer 102 software code of a software program. A software program may contain code representing one or more modules, and the code representing a particular module can be represented by consecutive or non-consecutive lines of code.

As will be appreciated by one skilled in the art, aspects of the present invention may be embodied/implemented as a computer system, method or computer program product. The computer program product can have a computer processor or neural network, for example, that carries out the instructions of a computer program. Accordingly, aspects of the present invention may take the form of an entirely hardware embodiment, an entirely software embodiment, and entirely firmware embodiment, or an embodiment combining software/firmware and hardware aspects that may all generally be referred to herein as a "circuit," "module," "system," or an "engine." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performance system, apparatus, or device.

The program code may perform entirely on the user's computer, partly on the user's computer, completely or partly on the thermal printer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowcharts/block diagrams in the Figures illustrate the architecture, functionality, and operation of possible implementations of systems, methods, and computer program products according to various embodiments of the present invention. In this regard, each block in the flowcharts/block diagrams may represent a module, segment, or portion of code, which comprises instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While several embodiments of the invention have been discussed, it will be appreciated by those skilled in the art that various modifications and variations of the present invention are possible. Such modifications do not depart from the spirit and scope of the present invention.

What is claimed is:

1. A server, comprising a nontransitory storage medium, storing program code configured to:
   receive a disconnect notice having a disconnect timestamp, the disconnect timestamp representing a time a printer was disconnected from a host computer;
   receive from a reader a request for validation, the request having a print timestamp derived from a security feature printed by the printer;
   compare, with a processor, the disconnect timestamp with the print timestamp to determine if the security feature was printed after printer was disconnected from the host computer; and
   lock the printer upon determining at least one of the following:
   that the printer was disconnected from the host computer; or
   that the security feature was printed after the disconnect timestamp.

2. The server of claim 1, wherein the disconnect notice is received from the host computer.

3. The server of claim 1, wherein the disconnect notice is received from the printer.

4. The server of claim 1, wherein the server is further configured to:
   notify a user upon determining that the security feature was printed after the disconnect timestamp.

5. The server of claim 1, wherein the server is further configured to:
   receive a reconnect notice having a reconnect timestamp, the reconnect timestamp representing a time the printer was reconnected to the host computer;
   compare the disconnect timestamp with the reconnect timestamp to determine if the security feature was printed before the printer was reconnected to the host computer.

6. The server of claim 5, wherein the reconnect notice is received from the host computer.

7. The server of claim 5, wherein the reconnect notice is received from the printer.

8. The server of claim 5, wherein the server is further configured to:
   notify a user upon determining that the security feature was printed after the disconnect timestamp and before the reconnect timestamp.

9. The server of claim 5, wherein the server is further configured to:
   lock the printer upon determining that the security feature was printed after the disconnect timestamp and before the reconnect timestamp.

10. A server, comprising a nontransitory storage medium, storing program code configured to:
    receive a print value representing a number of instances that a printer has printed a security feature;

receive a request value representing a number of instances that a host computer has requested that the printer print the security feature;

compare, with a processor, the print value to the request value to determine whether a security feature was printed without a request by the host computer; and lock the printer upon determining that the print value exceeds the request value.

11. The server of claim 10, further configured to notify a user upon determining that the print value exceeds the request value.

12. The server of claim 10, wherein the print value is received from the printer.

13. The server of claim 10, wherein the print value is received from the host computer.

14. A computer comprising a nontransitory storage medium, storing program code configured to:

receive a print value representing a number of instances that a printer has printed a security feature;

retrieve a stored predetermined authorized print value representing a predetermined limit on a number of instances that the printer is authorized to print the security feature;

compare, with a processor, the print value to the predetermined authorized print value to determine whether a security feature was printed outside of the predetermined limit; and lock the printer upon determining that the print value exceeds the predetermined limit.

15. The computer of claim 14, further configured to notify a user upon determining that the print value exceeds the predetermined limit.

16. The computer of claim 14, wherein the print value is received from the printer.

17. The computer of claim 14, wherein the print value is received from the host computer.

* * * * *